June 28, 1960 A. J. LINCOLN ET AL 2,943,300

BIASED-DIODE MAGNETIC TRANSFER LOOPS

Filed April 22, 1954

INVENTORS
ANDREW J. LINCOLN
GEORGE E. LUND
ALBERT J. MEYERHOFF
BY
Laurence R. Brown
ATTORNEY United States Patent Office 2,943,300
Patented June 28, 1960

2,943,300

BIASED-DIODE MAGNETIC TRANSFER LOOPS

Andrew J. Lincoln, Philadelphia, George E. Lund, Havertown, and Albert J. Meyerhoff, Wynnewood, Pa., assignors to Burroughs Corporation, Detroit, Mich., a corporation of Michigan Filed Apr. 22, 1954, Ser. No. 424,922

5 Claims. (Cl. 340—174)

This invention relates to magnetic memory circuits, and more particularly it relates to static magnetic storage element transfer loops for passing information from one magnetic element to another only when a predetermined enabling condition is established while a magnetic element is switched from one remanence condition to another.

Early prior art magnetic storage elements have been extensively used as switching devices in shift register circuits. The magnetic switching elements of these registers have taken advantage of the substantially rectangular hysteresis characteristics exhibited by magnetic core materials. These elements tend to remain in one or the other permanent magnetic remanence condition after being driven into magnetic saturation of the corresponding polarity. In general the elements are saturated by signals presented at transformer windings about the cores, which are conventionally although not necessarily of toroidal configuration. The two states of magnetic remanence provided by these cores enable them to store binary information efficiently and retain it statically until removed. Because of the rectangular hysteresis characteristic of the core, little voltage will be induced in the windings by input signals of a polarity tending to establish a saturation polarity corresponding to the remanence condition within the core. However, when the storage state is disturbed by an input signal opposite in polarity to the remanent storage state of the element, a high voltage is induced in the transformer windings. Accordingly, the elements may be interrogated with a signal of known polarity to thereby determine the remanence condition by the presence or absence of an output signal in the transformer windings about the element.

Early prior art magnetic elements having a plurality of output windings about the core material provided a signal transfer from all of the output windings when the element was interrogated. It was not possible with these elements to read information out into separate specified circuits from the same core at different times. Therefore, circuits were later developed for effecting a conditional transfer into one of several specified output circuits about an element, or for effecting a conditional transfer out of a particular element in response to a predetermined condition. Such circuits are disclosed and claimed in the copending application of John O. Paivinen Serial No. 762,863, filed September 23, 1958, as a continuation of three earlier filed applications, namely, Serial Nos. 396,603, and 396,605, filed December 7, 1953, and Serial No. 420,135, filed March 31, 1954, the latter being a continuation-in-part of application Serial No. 396,604, filed Dec. 7, 1953, all four of said earlier applications being now abandoned. In general the predetermined transfer condition is established by passing a current flow in a transfer coupling loop between two elements. By placing two diode rectifiers in the transfer loop, the current flow through one of the diodes is inhibited during the interrogation operation. A tapped input winding provided upon the receiving element therefore is used to set up opposing flux in response to the current flow through the respective diodes, so that an unbalance is provided when current flow through the one diode is inhibited. The resulting flux tends to place the receiving storage element in one of its remanence storage conditions, and is designed to saturate the core no matter what prior storage condition it may be in.

Although these conditional transfer circuits have been extremely useful and flexible in operation, they heretofore have required considerable driving power, and have been limited in operational speed because of the loading effect upon the transmitting element by the receiving element after it has been switched.

It is, accordingly, a general object of the invention to provide improved conditional transfer circuits for transferring information between two static magnetic storage elements.

A further object of the invention is to provide biased-diode magnetic transfer loops in which the receiving element does not load the transmitting element after the receiving element is switched to the desired storage state.

It is another object of the invention to provide efficient and reliable high speed magnetic storage transfer loops.

Realization of these and other improvements is accomplished by operating conditional transfer loops having biased-diode coupling means in such a manner that the receiving element does not present a load to the transmitting element after the switching of the receiving element takes place. Accordingly, the switching time becomes non-critical and it is possible to provide much higher speed of operation than heretofore feasible. With such operation, the magnetic circuits are more efficient since the current requirements are substantially decreased by isolating the receiving core load during the switching interval. This leads to more reliable circuits capable of connection in long cascaded chains.

Further objects and features of the invention will be found throughout the following specification which describes the invention in greater detail. For a more complete understanding of the invention the specification may be considered in connection with the accompanying drawings, in which.

Figure 1:
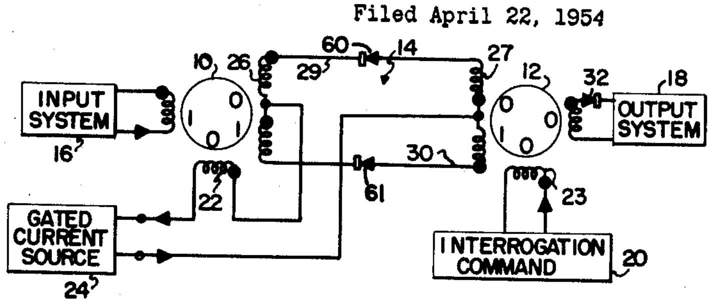
Fig. 1 is a circuit diagram of a static magnetic storage system coupled for transferring information between two magnetic cores in response to a predetermined condition, this circuit being similar to that shown in the aforesaid copending application of John O. Paivinen, Serial No. 762,863.

Throughout the drawings block circuit diagrams are used to indicate well known circuits, whose details are not a part of the present invention, in order to more clearly indicate those features of novelty contributed by this invention. Where possible, like reference characters are used to indicate similar component parts throughout the drawings to facilitate comparison of the several views.

The static magnetic storage system in Fig. 1 schematically shows a pair of magnetic cores 10 and 12 coupled by a biased-diode conditional transfer circuit generally indicated at 14. In order to understand the operation of the invention consider first the transfer circuit, which is described in the hereinbefore mentioned copending applications, by tracing through the operational conditions effected within the respective transformer windings about the magnetic cores 10 and 12. The dot notation is used at one end of the windings to signify that the particular direction of current flow indicated by arrows on the associated leads will excite magnetic flux of one polarity arbitrarily designated as "0" when the current enters a dotted winding terminal, and conversely the opposite magnetic flux of a polarity designated as "1" when current enters the undotted winding terminal. In general, those windings associated with the input system 16 and output system 18 may be used to store or provide output signals of either desired polarity. To keep the input power at a minimum, the input signal generally is used to set the first core 10 into one remanence condition with a first operation. Read-out is later effected into the second core 12 by means of an interrogation signal derived from an external power source 24. The interrogation command circuit 20 coupled with core 12 will provide current flow in such a direction that the corresponding output signal is presented to output system 18 upon switching of the core 12 from the storage condition "1" to the reset condition "0."

A transfer of information stored in core 10 to core 12 is effected by means of current flow through the interrogation winding 22 from the gated current source 24. Interrogation winding 22 is coupled to the tap of transfer winding 26 to assure current flow through the conditional transfer loop 14 during the same time period that the core 10 is being interrogated. Separate current sources may be provided for interrogation winding 22 and the transfer loop 14, if desired. The current source 24 provides current pulses of such duration that element 10 is interrogated and reset by current flow through interrogation winding 22. The transfer loop 14 assures that the receiving element 12 will be placed in a storage condition corresponding to that which was in the transmitting element 10 at the time of interrogation, to thereby effectively cause a transfer of the stored information between transmitting element 10 and receiving element 12 when enabled by current flow in the transfer loop from an external current source such as 24. The enabling current flows through the respective taps of transfer loop windings 26 and 27 on the respective cores 10 and 12. Current tends to flow equally through two branch transfer paths 29 and 30 when the elements 10 and 12 are in a static storage condition, and the windings are center tapped. The circuit is designed to provide opposing balanced magnetic flux in each core when a static storage condition prevails.

The diode rectifiers 60 and 61 in the transfer paths 29 and 30 are poled to permit easy flow in one direction from winding 27 to winding 26 from the gated current source 24. The direction of current flow has no effect on the operation of the circuit as long as the direction of easy flow in each of the branch paths is the same. The diode rectifiers 60 and 61, however, prevent any circulating currents around the transfer loop in response to potentials induced in either winding 26 or 27. In this manner any potentials induced in the transfer windings of the respective elements are isolated from each other in the absence of the enabling current from source 24. However, when current is flowing equally through the two branches 29 and 30, the potential induced in output winding 26 of storage element 10, due to the switching of the remanence state of the core 10 in response to an interrogation caused by the current flow through winding 22, will tend to oppose the current flow through one of the branches and to aid the current flow through the other of the branches. Accordingly, the magnetic flux established by the input winding 27 of element 12 in response to the enabling current flow will be unbalanced enough to switch the core 12 and thereby store the desired information. This is in contrast to the static condition of the magnetic flux in winding 27 in response solely to the enabling current of source 24 when core 10 does not switch. In this last instance the flux established by each section of winding 27 is equal in magnitude and opposite in polarity so that the static storage condition of element 12 is undisturbed.

With this general manner of operation in mind, the travel of a bit of information from the input system 16 to the output system 18 may be traced. Thus, assume that the transmitting element 10 is initially in a reset "0" condition. At this time, the input system 16 inserts a bit of information to switch the remanence condition of element 10 to "1." During this switching the potential induced in winding 26 can not cause current flow in the transfer loop 14 because the diodes 60 and 61 prevent circulating current around the loop and the enabling current from source 24 is not flowing. Therefore little load is presented to the input circuit. After storage of the bit of information in element 10, a pulse of enabling current provided by source 24 causes current to flow through branches 29 and 30 and therefore through interrogation winding 22. This current through the interrogation winding causes element 10 to switch from the "1" storage condition to the "0" reset condition. As the switching operation takes place, a potential is induced in winding 26 which is positive at the upper end and, hence, will tend to inhibit current flow in the upper branch 29 and aid current flow in the lower branch 30, the current through the lower branch of winding 27 being sufficient to switch the core 12 from the "0" to the "1" state so that a "1" is stored in element 12. This transferred information may, in turn, be read out of element 12 by a conventional unconditional transfer circuit providing current flow through the interrogation winding 23 to thereby reset element 12 to "0" and provide a signal to output system 18. The diode rectifier 32 is so arranged in its circuit that no signal is seen by the output system 18 when the core 12 switches during the storage operation when current flows through the lower section of winding 27 as a bit of information is shifted from element 10 to element 12.

Figure 2:
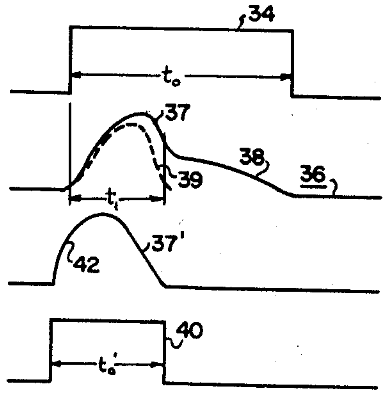
Fig. 2 is a waveform chart illustrating the method of operation of conditional transfer magnetic storage in accordance with the present invention.

In order to provide the entire switching operation, current must flow from source 24 for a period $t_0$ which is at least as long as the longest switching time of either element 10 or 12 during the transfer of information. This period $t_0$ is indicated in connection with the interrogation pulse waveform 34 of Fig. 2. Waveform 36 of Fig. 2 illustrates the reset operation within element 10 during the interrogation period. Ordinarily the receiving element 12 is entirely switched during the time interval $t_1$ which is shorter than the switching interval of the transmitting element 10. This action is indicated by the dotted waveform 39. However, as element 12 is switched on the downward slope 37 of waveform 36 in a conventional manner, it presents a greater load to the transmitting element than before, and thereby slows up the switching of element 10 by causing the tailout effect 38 to occur. By recalling that very little impedance is produced by windings to current flow tending to establish the same condition as that to which the core has been switched, it will be seen that the lower half of winding 27 after switching offers negligible impedance and will tend to pass increased current through the lower branch 30 which includes the lower half of winding 26. This increased current flow through the lower half of winding 26 opposes the change of element 10 to its "0" remanence state and therefore causes the tailout effect indicated at the trailing edge 38 of waveform 36.

This tailout effect makes it necessary to provide the enabling current for the entire period $t_0$ rather than the shorter period $t_0'$, illustrated by waveform 40, which is adequate when completion of the switching of element 10 (indicated by waveform 37') is permitted without the tailout effect. The current flowing through the lower section of winding 26 will, however, be ineffective either to switch the element back to its initial "1" state or to prevent switching to the "0" state because of the overriding flux established by the flow of current through the interrogation winding 22, which tends to establish the "0"

state. This is particularly true where winding 22 has more turns than the lower section of winding 26 which opposes the interrogation operation.

Figure 3:
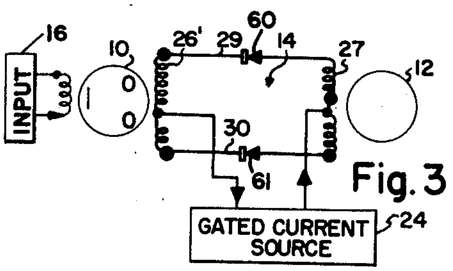
Figs. 3 and 4 are schematic diagrams of conditional transfer loops embodying the invention.

In certain applications of the present invention about to be described, it may be objectionable to supply the additional transformer interrogation winding. In such cases, the embodiment of Fig. 3 is provided, wherein the modified winding 26' of the conditional transfer loop 14 has an upper section with more turns than the lower section, and in addition has the two sections wound in opposite directions. This winding 26', therefore, may be caused to serve the same function as both the output transfer winding 26 and the interrogation winding 22 of Fig. 1. Because of the common connection between the two sections of winding 26', the current tends to flow in opposite directions in the lower and upper sections of the winding thereby tending to establish the same storage state "0" in element 10. In this manner the element 10 is interrogated. Furthermore, when the core 10 is switching from the "1" state to the "0" state, the current in the lower section of winding 26' induces a voltage in the said lower section which is positive at the dot end thereof, and by transformer action a step-up voltage is induced in the upper section of the winding 26' which is also positive at the dot end of the upper section. Thus, a bias is produced by current flow in the lower section, which cuts off the current flow through the upper diode 60 and upper section of the winding. The interrogation of element 10 is therefore largely caused by the current flowing through the lower branch path 30, which enters the dotted terminal of the lower section of winding 26' to set the element in its "0" state. In this manner the lower section of winding 26' provides both the interrogation and diode cutoff functions. Note that in the circuit arrangement of Fig. 3 there is no current flow through any part of winding 26' of transferor core 10 which establishes a magnetizing force opposite to that established by other current flow through another winding of the same core and which is attempting to switch the core to the "0" state. This is in contrast to the circuit of Fig. 1 where the current in the lower half of winding 26 establishes a magnetizing force which opposes that established by the current in winding 22.

Figure 4:
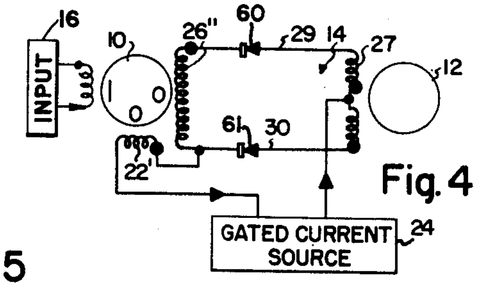

In accordance with a further embodiment of the present invention, the circuit of Fig. 4 is shown wherein an untapped winding 26'' may be provided on element 10, together with an interrogation winding 22'. The bias is produced by inductive coupling of windings 22' and 26'', which due to transformer step-up induces a voltage which is positive at the dot end of winding 26'' and cuts off the dynamic current flow in the upper diode 60. Note that in the circuit of Fig. 4, as in the circuit of Fig. 3, there is no transfer current flowing through a winding of core 10 which functions to buck and oppose the magnetizing force established by the transfer current which is attempting to switch the core to the "0" state. With the embodiment of Fig. 4, the transfer operations of static magnetic elements may be speeded up with fewer total turns about the respective magnetic cores 10, than with the embodiments of Figs. 1 and 3.

Figure 5:
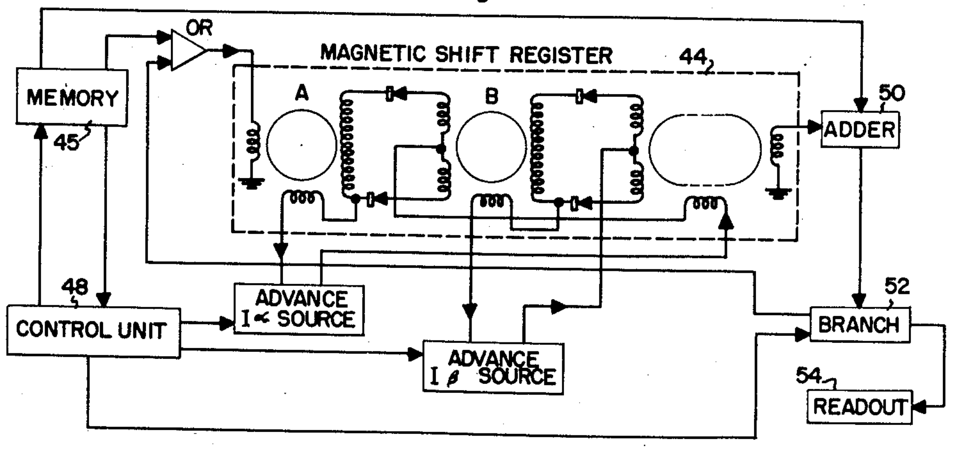
Fig. 5 is a circuit diagram of a high speed electronic computer system embodying the invention.

It is therefore possible by means of the present invention to provide improved high speed computer systems including magnetic shift register circuits, as illustrated in the circuit diagram of an electronic computer system shown in Fig. 5. The magnetic shift register 44 comprises a series of cascaded biased-diode magnetic transfer loops of the type shown in Fig. 4 and hereinbefore described, wherein alternate advanced current sources $I\alpha$ and $I\beta$ are provided in a conventional manner to assure alternate shifts of information into the storage elements A and the temporary storage elements B of the magnetic shift register. The computer circuit shown may comprise the accumulator of a large scale electronic computer system wherein information may be entered into the shift register 44 from the memory unit 45 by means of commands from control unit 48. Further information from the memory 45 may also be entered into the serial adder circuit 50 along with information passing out of the magnetic shift register 44. By means of the branch circuit 52 information may be passed after addition into the read out unit 54 or back into the magnetic shift register 44 for accumulation under direction of the control unit 48. The general operation of shift registers and accumulators is well known in the art and it is therefore readily recognized that the high speed magnetic shift register system made possible by means of the present invention may be used in this manner to afford improved computer operation.

We claim:

1. In combination; first and second magnetic cores each capable of assuming either of two stable states of magnetic remanence one of which is a reference state; a two-section read-out winding on said first core wound in the same sense, one of said sections having a substantially larger number of turns than the other; a two-section read-in winding on said second core wound in the same sense; a first asymmetrically conducting device connecting an outer end of said read-out winding to an outer end of said read-in winding; a second asymmetrically conducting device connecting the common junction of the two sections of said read-out winding to the other outer end of said read-in winding, thereby to form a loop, said first and second devices being poled in opposing manner to inhibit circulatory current flow around said loop; means for switching said first core to the state other than said reference state, said devices in said loop functioning to prevent transfer of energy to said second core during such switching; and means connected between the common junction of the two sections of said read-in winding and the other outer end of said read-out winding for driving transfer current through both said devices in parallel manner, the current through said first device also flowing through one section of said read-out winding in a direction to switch said first core to said reference state, the total current through both said devices flowing through the other section of said read-out winding in a direction also to switch said first core to said reference state, the net flux established in said second core by said transfer current in the event said first core is already in said reference state being substantially zero, the flux established in said first core by said total current through said other section of said read-out winding when said first core switches functioning to induce a stepped-up voltage in said one section of said read-out winding of a polarity to reverse bias said first device and thereby to inhibit current flow therethrough, thereby to cause substantially all of said current to flow through the other section of said read-in winding and thereby to apply sufficient net magnetizing force to said second core to switch the same, the total current through the other section of said read-out winding functioning to effect rapid switching of said first core.

2. In combination; first and second magnetic cores each capable of assuming either of two stable states of magnetic remanence one of which is a reference state; a two-section read-out winding on said first core wound in opposing senses, one of said sections having a greater number of turns than the other; a two-section read-in winding on said second core wound in the same sense; a first asymmetrically conducting device connecting an outer end of said read-out winding to an outer end of said read-in winding; a second asymmetrically conducting device connecting the other outer end of said read-out winding to the other outer end of said read-in winding, thereby to form a loop, said first and second devices being poled in opposing manner to inhibit circulatory current flow around said loop; means for switching said first core to the state other than said reference state, said devices in said loop functioning to prevent transfer of energy to said second core during such switching; and means connected between the common junctions of the two sections of said read-in and read-out windings for driving current through both said devices in parallel manner, the current through said first device also flowing through said one section of said read-out winding in a direction to switch said first core to the reference state, the current through said second device also flowing through the other section of said read-out winding in a direction also to switch said first core to the reference state, the net flux established in said second core by said transfer current in the event said first core is already in said reference state being substantially zero, the flux established in said first core by the flow of current through said other section of said read-out winding when said first core switches functioning to induce a stepped-up voltage in said one section of said read-out winding of a polarity to reverse bias said first device and thereby to inhibit current flow therethrough, thereby to cause substantially all of said current to flow through the other section of said read-in winding and thereby to apply sufficient net magnetizing force to said second core to switch the same.

3. In combination; a magnetic transferor core and a magnetic transferee core, each capable of assuming either of two stable states of magnetic remanence one of which is a reference state; first and second windings connected together and magnetically coupled to said transferor core, said first winding having a substantially larger number of turns than said second winding; a two-section read-in winding magnetically coupled to said transferee core; a transfer loop coupling said transferor and transferee cores, said loop including said two-section winding on said transferee core, at least said first winding on said transferor core, and first and second asymmetrical conducting devices poled in opposing manner to inhibit circulatory current flow around said loop; means for switching said transferor core to the state other than said reference state, said asymmetrical devices in said loop functioning to prevent transfer of energy to said transferee core during such switching; and means for connecting a source of transfer current between the common junction of the two sections of said transferee-core winding and one end of said transferor-core second winding for establishing two branch paths and for driving transfer current through said two branch paths in parallel manner, the transfer current through one of said branch paths flowing through one section of said transferee-core winding and through said transferor-core first winding in a direction to switch said transferor core to said reference state, the transfer current through said other branch path flowing through said other section of said transferee-core winding and through said transferor-core second winding in a direction also to switch said transferor core to said reference state, the net flux established in said transferee core by the total transfer current when said transferor core is already in said reference state at the time of application of said transfer current being insufficient to switch said transferee core, the transfer current flowing through said transferor-core second winding, when said transferor core switches from said other state to said reference state in response to said transfer current, inducing a stepped-up voltage in said transferor-core first winding of a polarity to reverse bias said first asymmetrical device thereby to inhibit transfer current flow through said one branch path and thereby to cause substantially all of said transfer current to flow thereafter through said other branch path including said other section of said transferee core winding, thereby to apply sufficient net magnetizing force to said transferee core to switch the same.

4. Apparatus as claimed in claim 3 characterized in that said transferor-core second winding is also included in said transfer loop, the said one end of said transferor-core second winding to which said source of transfer current is connectable being also connected to one end of said transferor-core first winding.

5. Apparatus as claimed in claim 3 characterized in that said transferor-core second winding is outside said transfer loop, the said one end of said transferor-core second winding to which said source of transfer current is connectable being the end remote from the end which is connected to one end of said transferor-core first winding.

References Cited in the file of this patent

UNITED STATES PATENTS

| | | |
|---|---|---|
| 2,519,513 | Thompson | Aug. 22, 1950 |
| 2,591,406 | Carter | Apr. 1, 1952 |
| 2,640,164 | Giel | May 26, 1953 |
| 2,649,568 | Felch | Aug. 18, 1953 |
| 2,680,819 | Booth | June 8, 1954 |
| 2,683,819 | Rey | July 13, 1954 |
| 2,695,993 | Haynes | Nov. 30, 1954 |
| 2,719,773 | Karnaugh | Oct. 5, 1955 |

OTHER REFERENCES

"Journal of Applied Physics," January 1950, "Static Magnetic Storage and Delay Line," by Wang et al., pp. 49–54.